(12) United States Patent
Gao

(10) Patent No.: US 12,250,927 B2
(45) Date of Patent: Mar. 18, 2025

(54) DOG LEASH CAPABLE OF STORING DRINK

(71) Applicant: Deng Gao, Guangshui (CN)

(72) Inventor: Deng Gao, Guangshui (CN)

( * ) Notice: Subject to any disclaimer, the term of this patent is extended or adjusted under 35 U.S.C. 154(b) by 0 days.

(21) Appl. No.: 18/357,074

(22) Filed: Jul. 21, 2023

(65) Prior Publication Data

US 2025/0008928 A1    Jan. 9, 2025

(30) Foreign Application Priority Data

Jul. 3, 2023   (CN) .......................... 202321744113.3

(51) Int. Cl.
*A01K 27/00* (2006.01)

(52) U.S. Cl.
CPC .......... *A01K 27/004* (2013.01); *A01K 27/008* (2013.01)

(58) Field of Classification Search
CPC ............................ A01K 27/004; A01K 27/008
See application file for complete search history.

(56) References Cited

U.S. PATENT DOCUMENTS

| | | | | |
|---|---|---|---|---|
| 8,573,160 | B1* | 11/2013 | Knight | A01K 27/008 119/796 |
| 2011/0197820 | A1* | 8/2011 | Goldy | A01K 5/0114 119/61.5 |
| 2011/0290188 | A1* | 12/2011 | Lopez | A01K 27/008 119/72 |
| 2012/0186539 | A1* | 7/2012 | Johnston | A01K 27/004 119/796 |
| 2014/0360440 | A1* | 12/2014 | Fox | A01K 15/025 119/796 |
| 2017/0071163 | A1* | 3/2017 | Glasser | A01K 7/00 |
| 2021/0045357 | A1* | 2/2021 | Alexander | A01K 27/004 |
| 2023/0301274 | A1* | 9/2023 | Shi | A01K 27/004 |

FOREIGN PATENT DOCUMENTS

| | | |
|---|---|---|
| CN | 202425440 U | 9/2012 |
| CN | 208549641 U | 3/2019 |

* cited by examiner

*Primary Examiner* — Joshua J Michener
*Assistant Examiner* — Nicole Paige MacCrate

(57) ABSTRACT

A dog leash capable of storing a drink comprises a container for accommodating a drink can or a cup, a silica gel cup sleeve sheathed outside the container, a lower cover fixed at a bottom portion of the container, a leash groove body located in the lower cover and buckled with the bottom portion of the container, a volute spiral spring located in the leash groove body, a flat leash located in a groove body on an outer side of the leash groove body and stretched outside the lower cover, and a leash hook fixed at a free end of the flat leash, the container is provided with a plurality of openings in an inner wall close to a bottle mouth of the container, and a silica gel anti-slip plug is fixed in each opening; and the silica gel anti-skid plug is provided with an outward extension part.

7 Claims, 5 Drawing Sheets

DOG LEASH CAPABLE OF STORING DRINK

CROSS REFERENCE TO RELATED APPLICATIONS

This application claims foreign priority of Chinese Patent Application No. 202321744113.3, filed on Jul. 3, 2023 in the China National Intellectual Property Administration, the disclosures of all of which are hereby incorporated by reference.

TECHNICAL FIELD

The application relates to the technical field of pet supplies, and particularly to a dog leash capable of storing a drink.

BACKGROUND OF THE PRESENT INVENTION

Nowadays, many families choose to keep pets to enrich their lives, so that it is more and more common to take leisure travels with dogs. In the case of hot weather and long-time play, pets need to replenish water in time to prevent water shortage and heatstroke. However, it is troublesome to bring a special drinking water and food basin separately every time, and traditional drinking water bowls are bulky, single in function and uneasy to take outside, while dog leash is an essential article for civilized and legal pet raising. Therefore, a dog leash capable of storing a drink is provided.

SUMMARY OF PRESENT INVENTION

The application aims to provide a dog leash capable of storing a drink which has more functions and makes a drink can or a cup stuck.

The application provides a dog leash capable of storing a drink, comprising a container for accommodating a drink can or a cup, a silica gel cup sleeve sheathed outside the container, a lower cover fixed at a bottom portion of the container, a leash groove body located in the lower cover and buckled with the bottom portion of the container, a volute spiral spring located in the leash groove body, a flat leash located in a groove body on an outer side of the leash groove body and stretched outside the lower cover, and a leash hook fixed at a free end of the flat leash, the container is provided with a plurality of openings in an inner wall close to a bottle mouth of the container, and a silica gel anti-slip plug is fixed in each opening; and the silica gel anti-skid plug is provided with an outward extension part extending out of the corresponding opening and used for fixing the drink can or the cup.

Preferably, three openings are evenly provided, and three silica gel anti-slip plugs are also evenly provided.

Preferably, the bottle mouth of the container is provided with two recesses.

Preferably, the container is provided with a clamping body extending downwards from the bottom portion of the container, and the clamping body penetrates through a center of the leash groove body, so that the leash groove body is fixed at the bottom portion of the container; and one end of the volute spiral spring is inserted into the clamping body, and the volute spiral spring is capable of controlling a length of the flat leash.

Preferably, the dog leash capable of storing the drink further comprises a leash fixing pin inserted into the leash groove body and fixed between the flat leash and the volute spiral spring.

Preferably, the dog leash capable of storing the drink further comprises a switch fixed at a bottom portion of the lower cover.

Preferably, the dog leash capable of storing the drink further comprises a first hook hole arranged on an outer side at an upper end of the container and used for hanging a handle, and a second hook hole arranged on an outer side the lower cover and used for hanging the handle.

Preferably, the dog leash capable of storing the drink further comprises the handle fixed between the first hook hole and the second hook hole.

Preferably, the container is also provided with a plurality of first fixing protrusions extending from the bottom portion of the container, and a fixing member penetrates through the lower cover to be fixed into the corresponding first fixing protrusion.

According to the application, by arranging the silica gel anti-slip plug in the container to prevent the drink can or the cup from being separated, the drink can or the cup is stuck in the container, so that the dog leash has more functions to meet popular demands.

DETAILED DESCRIPTION OF PREFERRED EMBODIMENTS

In order to make the objects, the technical solutions, and the advantages of the application clearer, the application is further described in detail hereinafter with reference to the drawings and embodiments. It should be understood that specific embodiments described herein are only used for explaining the application and are not intended to limit the application.

Figure 1:
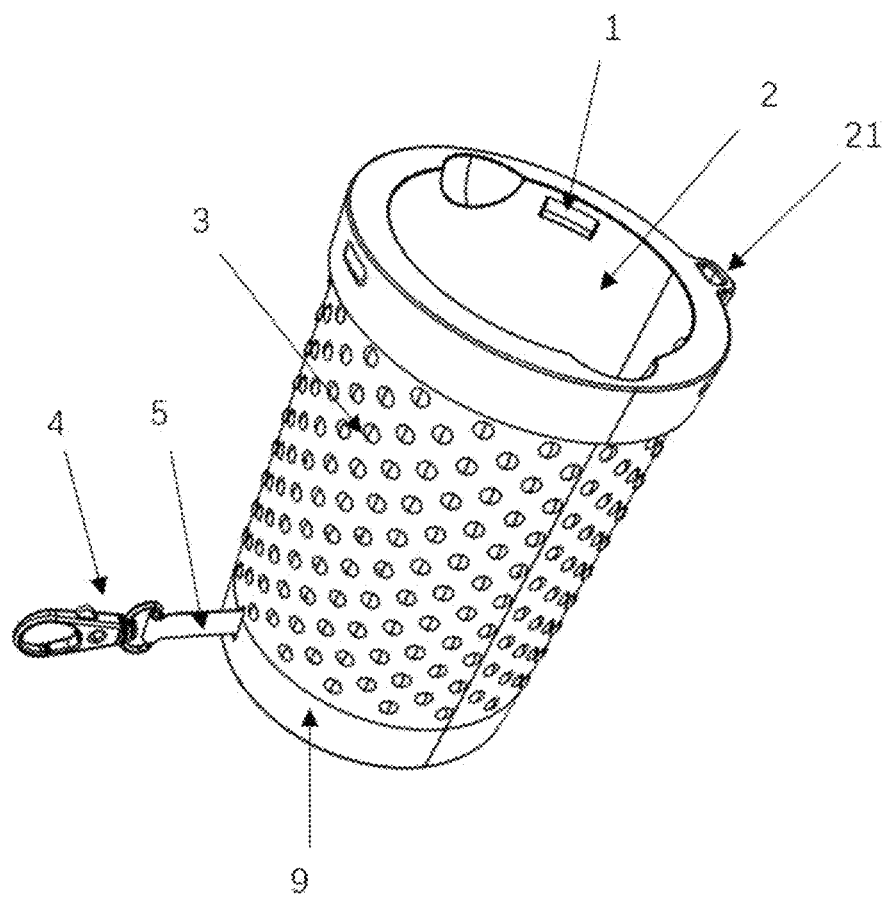
FIG. 1 is a schematic structural diagram of a dog leash according to an embodiment of the application.
Figure 2:
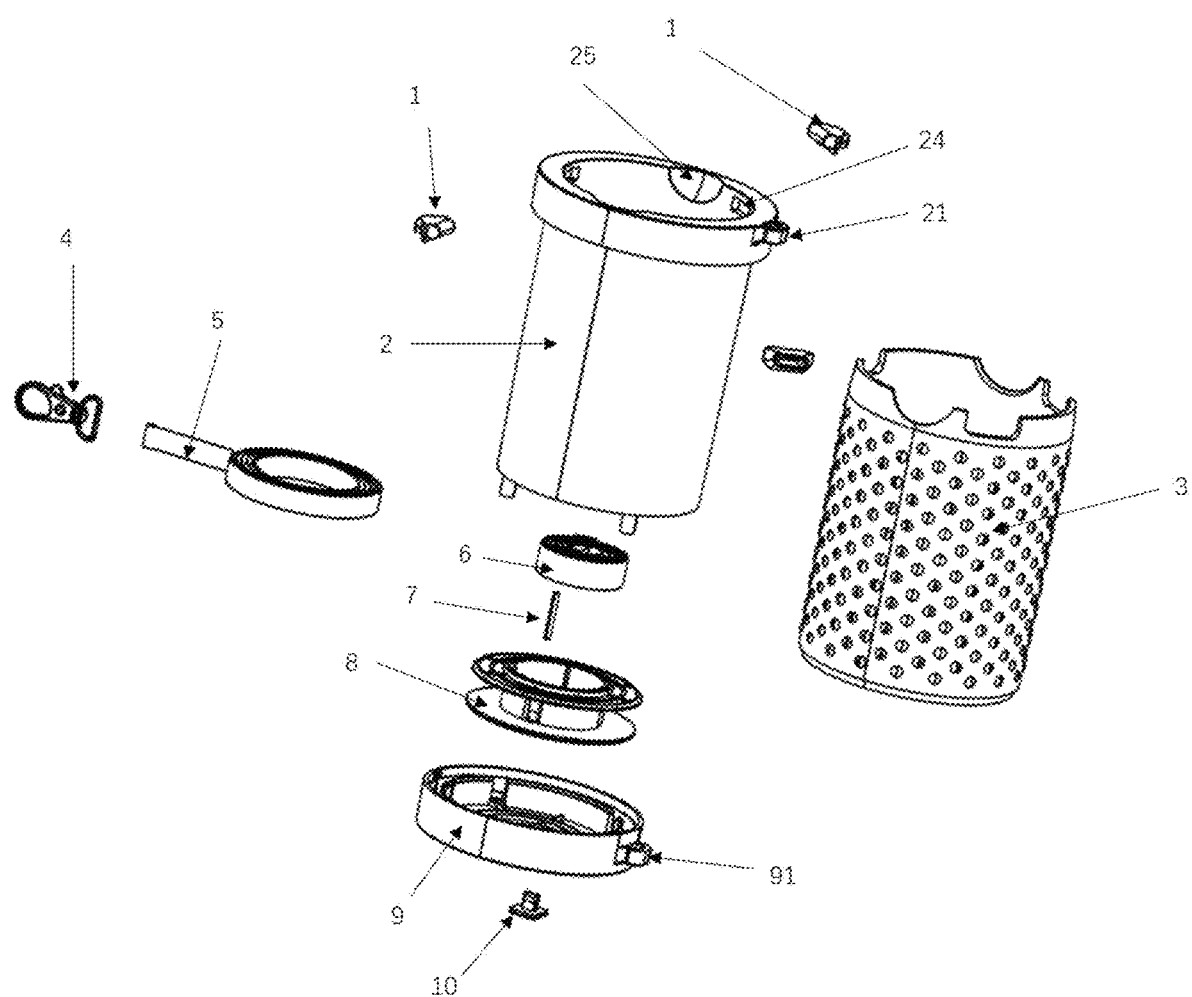
FIG. 2 is a stereoscopic exploded view of the dog leash according to the embodiment of the application.
Figure 3:
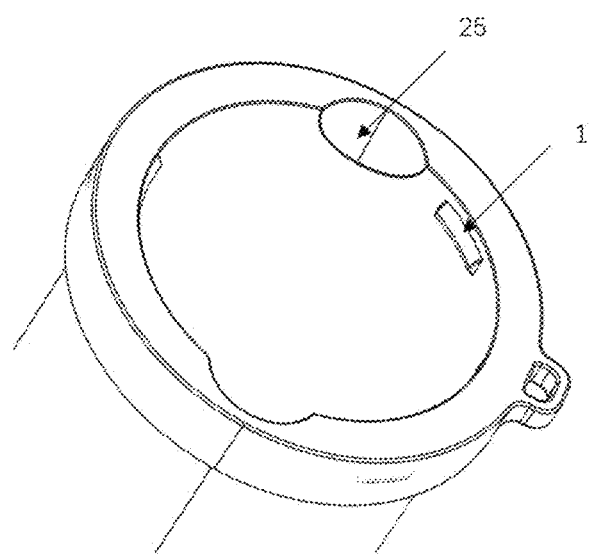
FIG. 3 is a schematic diagram of a silica gel anti-slip plug of the dog leash fixed in a container according to the embodiment of the application.
Figure 4:
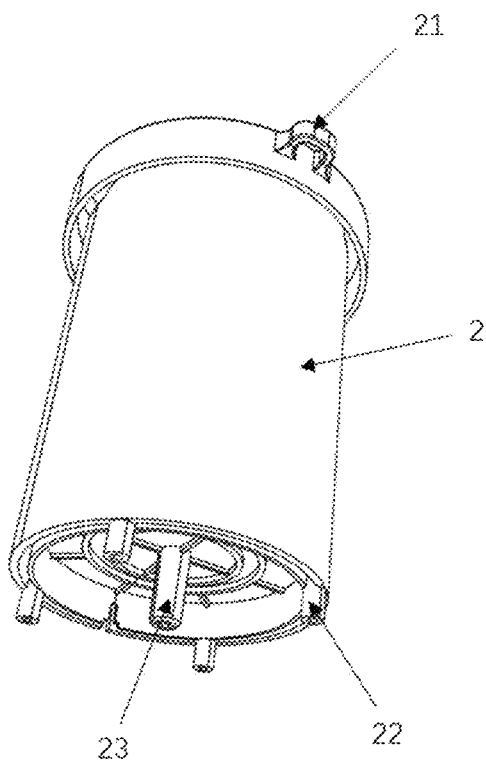
FIG. 4 and FIG. 5 are separate schematic diagrams of the container of the dog leash according to the embodiment of the application.
Figure 5:
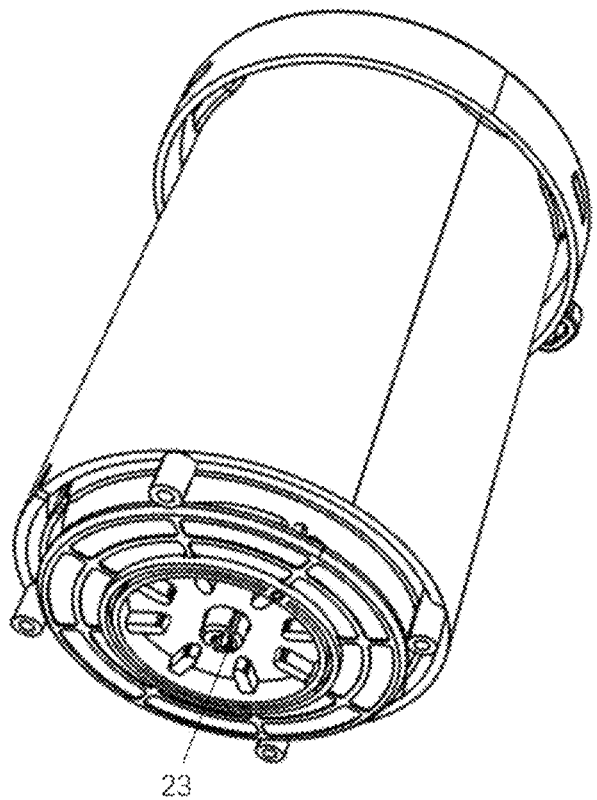
Figure 6:
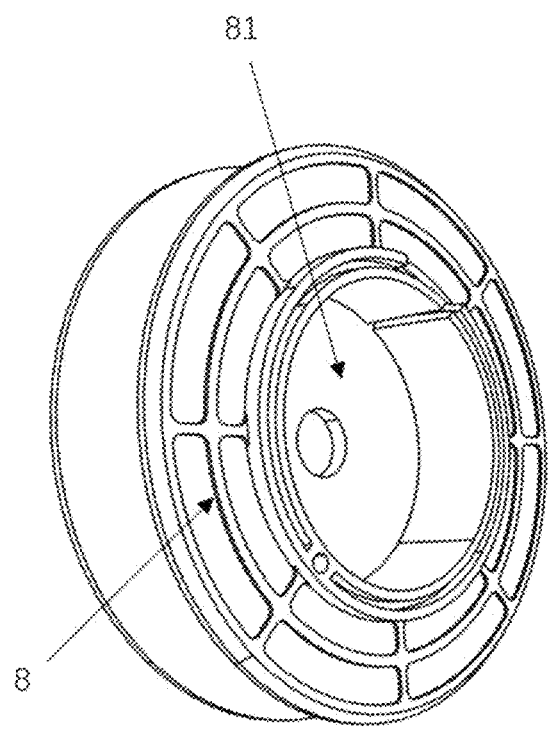
FIG. 6 is a separate schematic diagram of a leash groove body of the dog leash according to the embodiment of the application.
Figure 7:
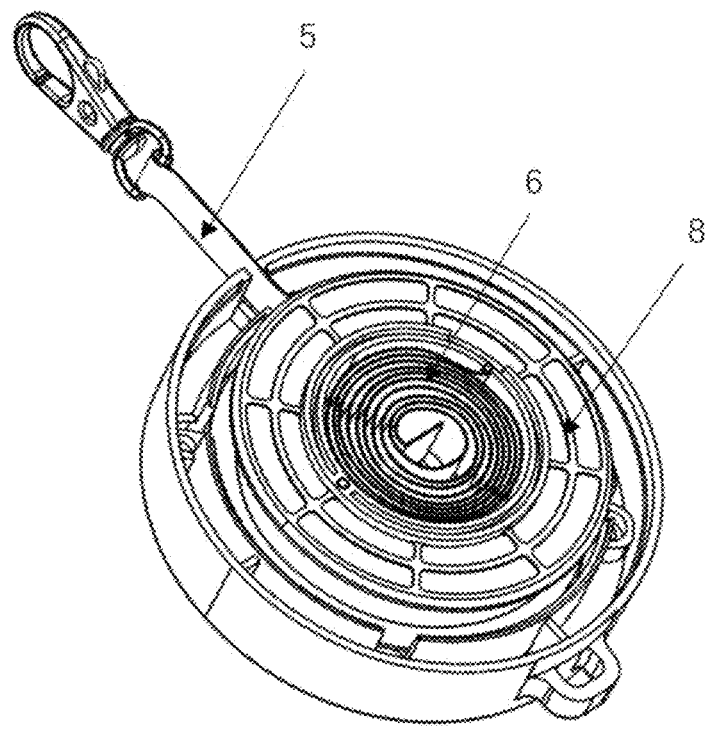
FIG. 7 and FIG. 8 are schematic diagrams of internal assembly of the leash groove body of the dog leash according to the embodiment of the application.
Figure 8:
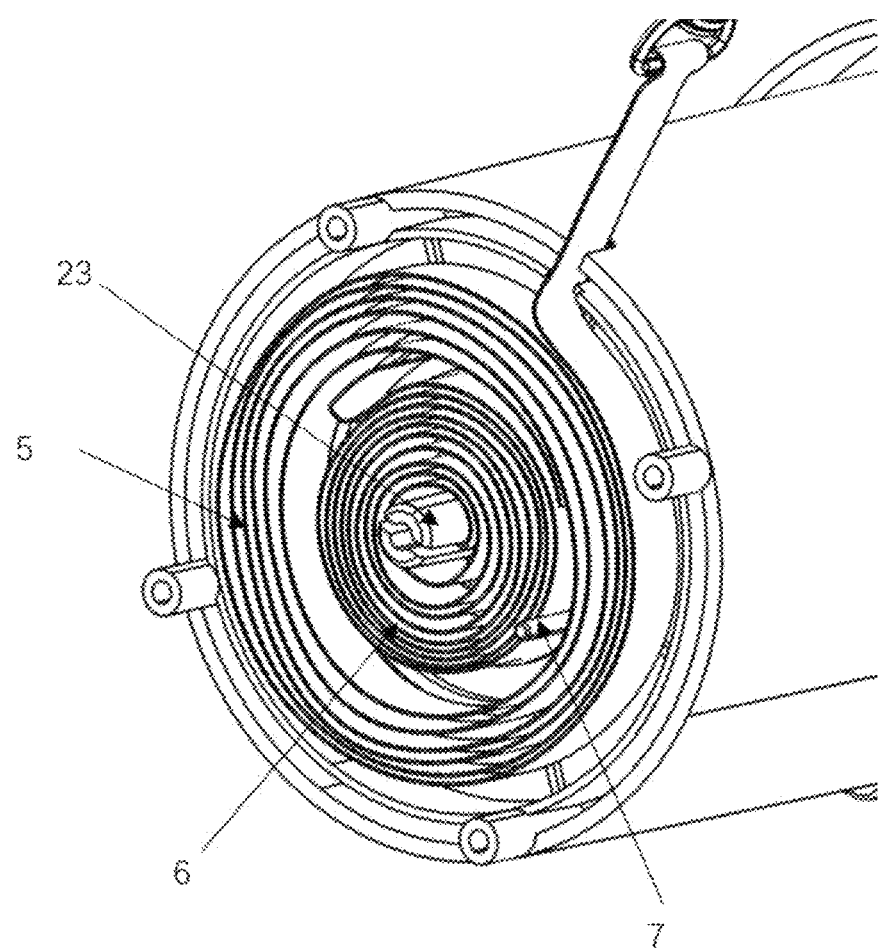

The application discloses a dog leash capable of storing a drink, and as shown in FIG. 1 to FIG. 8, the dog leash comprises a container 2 for accommodating a drink can or a cup, a silica gel cup sleeve 3 sheathed outside the container 2, a lower cover 9 fixed at a bottom portion of the container 2, a switch 10 fixed at a bottom portion of the lower cover 9, a leash groove body 8 located in the lower cover 9 and buckled with the bottom portion of the container 2, a volute spiral spring 6 (used for automatic retraction of a pet leash) located in the interior 81 of the leash groove body 8, a flat leash (the pet leash) 5 located in a groove body on an outer side of the leash groove body 8 and stretched outside the lower cover 9, a leash fixing pin 7 inserted into the leash groove body 8 and fixed between the flat leash (the pet leash) 5 and the volute spiral spring 6, a leash hook 4 fixed at a free end of the flat leash (the pet leash) 5, a first hook hole 21 arranged on an outer side at an upper end of the container 2 and used for hanging a handle, and a second hook hole 91 arranged on an outer side the lower cover and used for hanging the handle.

The container 2 is also provided with a plurality of first fixing protrusions 22 extending from the bottom portion of the container, and a fixing member (such as a screw) penetrates through the lower cover 9 to be fixed into the corresponding first fixing protrusion 22, so that the lower cover 9 is fixed at the bottom portion of the container 2.

The container 2 is also provided with a clamping body 23 extending downwards from the bottom portion of the container, and the clamping body 23 penetrates through a center of the leash groove body 8, so that the leash groove body 8 is fixed at the bottom portion of the container 2; and meanwhile, one end of the volute spiral spring 6 is inserted into the clamping body 23, and the volute spiral spring 6 is capable of controlling a length of the flat leash (the pet leash) 5.

A drink can, a beer can, a water cup or a pet water cup may be stored in an interior of the container 2.

The container 2 is provided with a plurality of openings 24 in an inner wall close to a bottle mouth of the container, and a silica gel anti-slip plug 1 is fixed in each opening 24. The silica gel anti-skid plug 1 is provided with an outward extension part extending out of the corresponding opening 24. Because the silica gel anti-slip plug 1 is elastic, the outward extension part is also elastic. When the drink can or the cup enters the container 2 by squeezing the outward extension part, the outward extension part may just be used for fixing the drink can or the cup, so that the drink can or the cup is uneasy to fall out of the container 2, and the silica gel anti-slip plug 1 may prevent the drink can or the cup from slipping out of the container 2.

An inner diameter of the corresponding container 2 is suitable for size requirements of conventional drinks, and the size of the container may also be designed to meet requirements of more drinks.

In the embodiment, three openings 24 are evenly provided, which means that three silica gel anti-slip plugs 1 are also evenly provided.

The bottle mouth of the container 2 is provided with two recesses 25 to facilitate taking out the drink can or the cup.

The dog leash capable of storing the drink according to the application further comprises the handle (not shown in the drawings) fixed between the first hook hole 21 and the second hook hole 91. The handle may be adjusted, when the handle is adjusted to be the shortest, the handle may be held by hand, which facilitates carrying, and the handle may also be adjusted to be long, so that the handle may be tied to a shoulder of a person. When the drink can or the cup is opened and placed in the container 2, the person or the pet may directly drink through a straw at any time, thus freeing hands of the person.

When assembling, the silica gel cup sleeve 3 penetrates through the container 2 from the bottom portion of the container 2 first, so that the silica gel cup sleeve 3 is sheathed on an outer wall of the container 2. Subsequently, the leash groove body 8 equipped with the volute spiral spring 6 and the flat leash (the pet leash) 5 is buckled on the clamping body 23 of the container 2. Finally, the lower cover 9 is mounted, and the fixing member (such as the screw) penetrates through the lower cover 9 to be fixed to the corresponding first fixing protrusion 22, so that the lower cover 9 is fixed at the bottom portion of the container 2.

The dog leash capable of storing the drink of the application is a bottle body with a single bottle mouth, the bottom portion of the container 2 is provided with the flat leash (the pet leash) 5, and the flat leash (the pet leash) 5 may be stretched and retracted through the volute spiral spring 6. A longest length of the flat leash (the pet leash) 5 capable of being stretched is 2.5 meters, and one end of the flat leash (the pet leash) 5 is provided with the leash hook 4, which may be buckled on a dog collar.

The drink can and the cup may be stored in the dog leash of the application, so that it is unnecessary to hold the drink by one hand and grasp the dog leash by the other hand when walking a dog. The drink can and the cup is uneasy to fall out of the container through the silica gel anti-slip plug. The application is also provided with the adjustable handle, which may be entirely slung over the shoulder to make the dog play by itself, thus realizing water drinking without holding the drink by hand, and avoiding carrying the drink by hand all the time. The application is provided with the leash fixing pin, which may adjust the length of the flat leash (the pet leash).

According to the application, by arranging the silica gel anti-slip plug in the container to prevent the drink can or the cup from being separated, the drink can or the cup is stuck in the container, so that the dog leash has more functions to meet popular demands.

The above are only the preferred embodiments of the application, and are not intended to limit the application in any form. Although the application has been disclosed above by the preferred embodiments, the preferred embodiments are not intended to limit the application. Those skilled in the art can make some changes or modifications as equivalent embodiments with equivalent changes by using the technical contents disclosed above without departing from the scope of the technical solutions of the application. However, for the contents not departing from the scope of the technical solutions of the application, any simple amendments, equivalent changes and modifications made to the above embodiments according to the technical essence of the application are still included in the scope of the technical solutions of the application.

I claim:

1. A dog leash capable of storing a drink, comprising: a container (2) for accommodating a drink can or a cup, a silica gel cup sleeve (3) sheathed outside the container (2), a lower cover (9) fixed at a bottom portion of the container (2), a leash groove body (8) located in the lower cover (9) and buckled with the bottom portion of the container (2), a volute spiral spring (6) located in the leash groove body (8), a flat leash (5) located in a groove body on an outer side of the leash groove body (8) and stretched outside the lower cover (9), and a leash hook (4) fixed at a free end of the flat leash, wherein the container (2) is provided with a plurality of openings (24) in an inner wall close to a bottle mouth of the container, and a silica gel anti-slip plug (1) is fixed in each opening; and the silica gel anti-slip plug (1) is provided with an outward extension part extending out of the corresponding opening (24) and used for fixing the drink can or the cup.

2. The dog leash capable of storing the drink according to claim 1, wherein three openings are evenly provided, and three silica gel anti-slip plugs (1) are also evenly provided.

3. The dog leash capable of storing the drink according to claim 1, wherein the bottle mouth of the container is provided with two recesses (25).

4. The dog leash capable of storing the drink according to claim 1, wherein the container (2) is provided with a clamping body (23) extending downwards from the bottom portion of the container, and the clamping body (23) penetrates through a center of the leash groove body (8), so that the leash groove body (8) is fixed at the bottom portion of the container (2); and one end of the volute spiral spring (6) is inserted into the clamping body (23), and the volute spiral spring (6) is capable of controlling a length of the flat leash (5).

5. The dog leash capable of storing the drink according to claim 1, further comprising a leash fixing pin (7) inserted into the leash groove body (8) and fixed between the flat leash (5) and the volute spiral spring (6).

6. The dog leash capable of storing the drink according to claim 1, further comprising a switch (10) fixed at a bottom portion of the lower cover (9).

7. The dog leash capable of storing the drink according to claim 1, wherein the container (2) is also provided with a plurality of first fixing protrusions (22) extending from the bottom portion of the container, and a fixing member penetrates through the lower cover (9) to be fixed into the corresponding first fixing protrusion (22).

\* \* \* \* \*